United States Patent [19]

Smith et al.

[11] 4,122,877
[45] Oct. 31, 1978

[54] RING TYPE DEBARKER

[76] Inventors: Bob R. Smith, 445 Sun Valley Rd., Birmingham, Ala. 35215; Harold L. West, Rte. 1, Box 297, Leeds, Ala. 35094; Thomas L. Bray, 452 Crest Dr., Birmingham, Ala. 35209; Robert H. Wilder, Sr., 1141 Lay Dr., Birmingham, Ala. 35215

[21] Appl. No.: 812,909

[22] Filed: Jul. 5, 1977

[51] Int. Cl.² .............................................. B27L 1/00
[52] U.S. Cl. .................... 144/208 E; 144/311
[58] Field of Search ............... 144/208 R, 208 E, 311, 144/2 R, 2 Z

[56] References Cited

U.S. PATENT DOCUMENTS

| 2,945,706 | 7/1966 | Franked | 144/208 E |
| 3,236,273 | 2/1966 | Rich et al. | 144/208 E |
| 3,552,456 | 1/1971 | Johansson | 144/208 E |
| 3,667,517 | 6/1972 | Bentley et al. | 144/208 E |

FOREIGN PATENT DOCUMENTS

| 716,368 | 8/1965 | Canada | 144/208 E |
| 875,913 | 7/1971 | Canada | 144/208 E |
| 2,240,921 | 3/1974 | Fed. Rep. of Germany | 144/208 E |

Primary Examiner—Othell M. Simpson
Assistant Examiner—W. D. Bray
Attorney, Agent, or Firm—Hugh P. Carter

[57] ABSTRACT

A ring type debarker in which the arm carrying section is mounted for rotation on a centrally disposed, tube-like member through which the logs pass while being debarked. The central support member is supported in cantilever fashion from the outfeed end thereof. Mounted for rotation with the arm carrying section are means to circulate oil through the main bearing which supports the rotary parts and an air compressor and a receiver for the same. Each arm is equipped with expansible flexible bellows-like air bag members for holding the tool ends of the arms in log engaging positions. The compressor and pump are driven by means of a ring gear mounted on the ring support member, the pump and compressor in turn carrying pinions in mesh with said ring gear.

5 Claims, 6 Drawing Figures

RING TYPE DEBARKER

This invention relates to ring type debarkers and has for an object the provision of such apparatus which shall be greatly simplified over previously existing debarkers and which shall be more rugged, more efficient and require less power to operate.

More in detail, an object of our invention is to provide a ring type debarker in which, broadly stated, the relative arrangement of the stationary and rotary parts is reversed over prior debarkers of this general type, namely, in which the central portion through which the logs pass while being debarked remains stationary while the outer portion which carries the debarking arms is driven.

A further object is to provide a debarker of the character designated in which the central tube-like member is supported in cantilever fashion from one end and in which the arm carrying portion of the device is mounted for rotation on the central support member.

A further object is to provide means to bias the tool or log engaging ends of the arms to their work which comprises air bag operators associated with each arm together with means carried by the rotary part of the apparatus to supply air under pressure to the air bag operators, thereby eliminating the requirement for rotary seals which would be necessary if the air under pressure were supplied from a source outside the moving parts of the apparatus.

Another object is to provide a bearing and lubrication system therefor which includes an oil pump carried by the rotary part of the apparatus and driven in response to its rotation, there being supply and return lines to the bearing cavity, whereby oil is circulated through the bearing at all times during the operation of the apparatus.

Yet another and more general object is to provide a ring type debarker which shall be rugged, more trouble-free insofar as maintenance is concerned than other ring type debarkers and to provide a design of a debarker which may be fabricated to take logs of minimum diameter up to those of maximum diameter.

A debarker illustrating features of our invention is shown in the accompanying drawings forming a part of this application in which.

Figure 1:
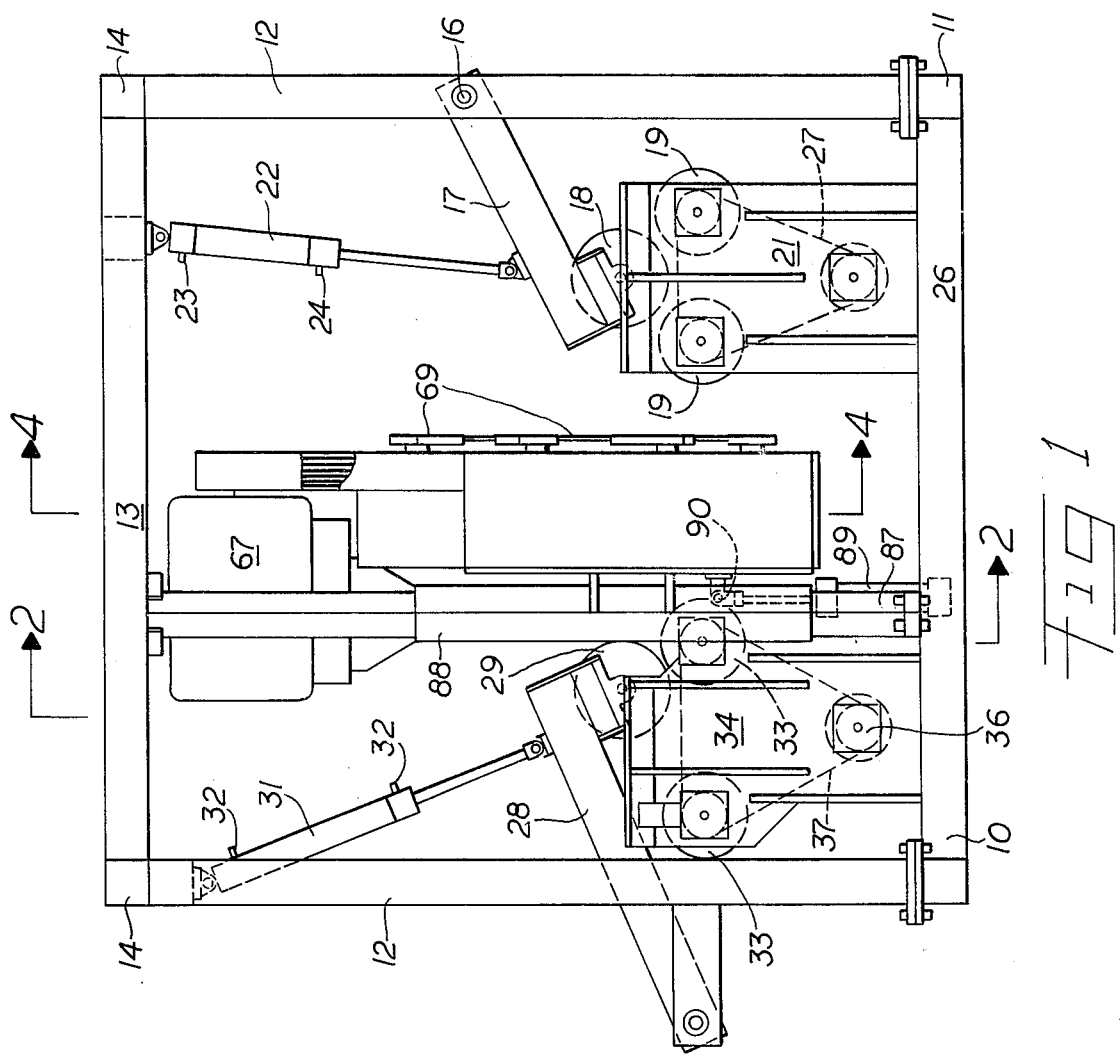
FIG. 1 is a side elevational view with certain parts broken away and in secton.
Figure 2:
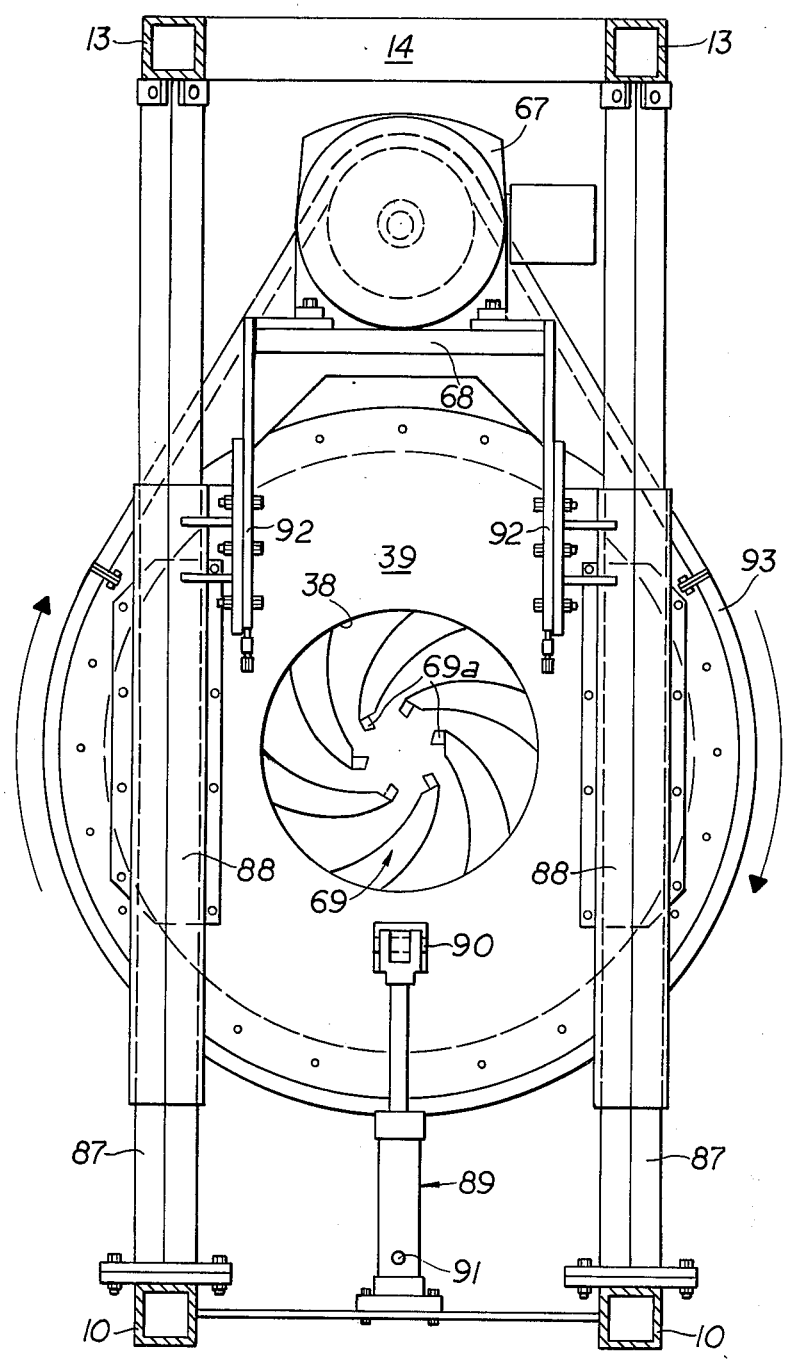
FIG. 2 is a view taken generally along line 2—2 of FIG. 1.
Figure 3:
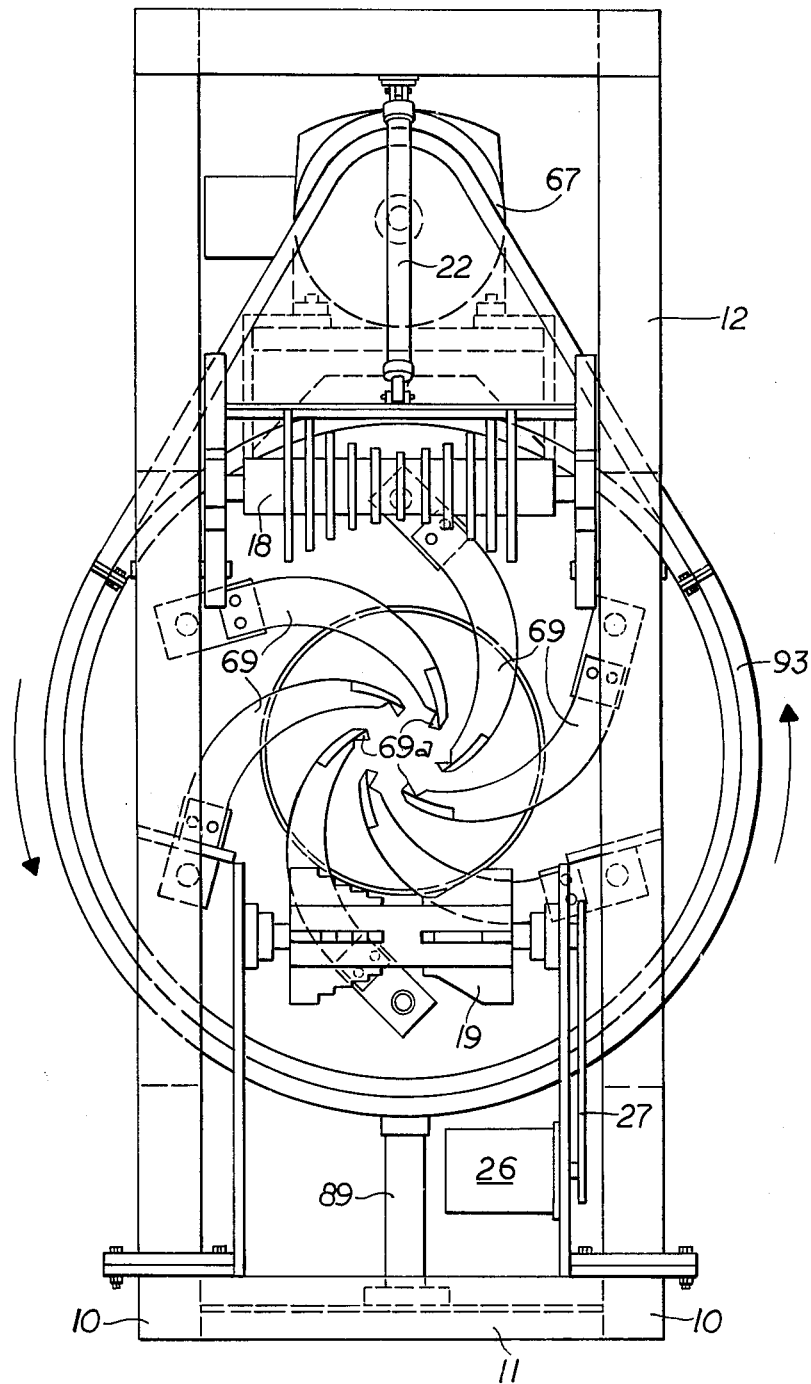
FIG. 3 is an end elevational view looking at the infeed end of the debarker.

Referring now to the drawings for a better understanding of our invention we show in FIG. 1 a frame which may embody lower longitudinally extending members 10 and connecting cross members 11. The frame also incorporates forward and rear vertically disposed members 12 connected by longitudinally directed overhead members 13. Cross members 14, at the top, complete the frame.

Pivotally mounted on a cross member 16 is a frame 17 which carries a hold-down roll 18. A pair of horizontally disposed log support rolls 19 is carried in a suitable vertical framework 21. The roll 18 is biased downwardly, to rest on top of a log to be fed into the debarker by means of a doubleacting fluid pressure cylinder 22 through the connections 23 and 24 from a source under control of a suitable valve, not shown.

The rolls 19 may be driven by a suitable motor 26 through a chain or the like indicated at 27.

At the opposite end of the frame we show outfeed means for the log which comprises a pivoted frame 28 which carries a hold-down roll 29. The frame and consequently the roll 29 may be moved up and down by means of a double-acting fluid pressure cylinder 31. Fluid under pressure may be admitted selectively to the cylinder 31 through the connections 32 from a source under control of a suitable valve, not shown. Quite similarily to the rolls 19, outfeed rolls 33 are supported in a suitable framework 34 and the rolls 33 may be driven by a motor 36 through a chain or the like 37.

From what has been so far described it will be seen that logs to be debarked may be fed from right to left as viewed in FIG. 1, namely, from the infeed side of the debarker presently to be described, through the debarker, to be removed by the power outfeed mechanism shown.

Our improved debarker comprises a tube-like centrally disposed member 38. The member 38 is supported on a plate 39, in cantilever fashion, the plate 39 being located at the discharge or outfeed side of the debarker as will presently appear.

Secured to the exterior surface of the central support member 38 is an annular member 41. On the exterior surface of the member 41 is the inner race 42 of an anti-friction bearing, the rollers of which are indicated by the numeral 43. While there may be other types of bearings which would be adequate for incorporation in our improved debarker, we prefer to use an "X" bearing manufactured by Messinger Bearings, Inc. of Philadelphia, Pennsylvania, and which is described in their bulletin No. J 72A. As will appear more fully from said bulletin such bearing comprises a multiplicity of the rollers 43 which are placed alternately at angles to each other, thus to provide a bearing which will withstand radial, thrust and overturning moment loads.

The outer race 44 of the bearing is carried by an annular member 46 which forms a part of the outer, rotary portion of our improved debarker as will appear. Extending radially outwardly from the member 46 adjacent the infeed side of the debarker is a plate 47 and depending from the end of the member 46 is another plate 48. The plate 48 carries an annular oil seal 49 which is in rotary contact with a machined, annular seat 41 on the infeed end of the member 38.

Figure 5:
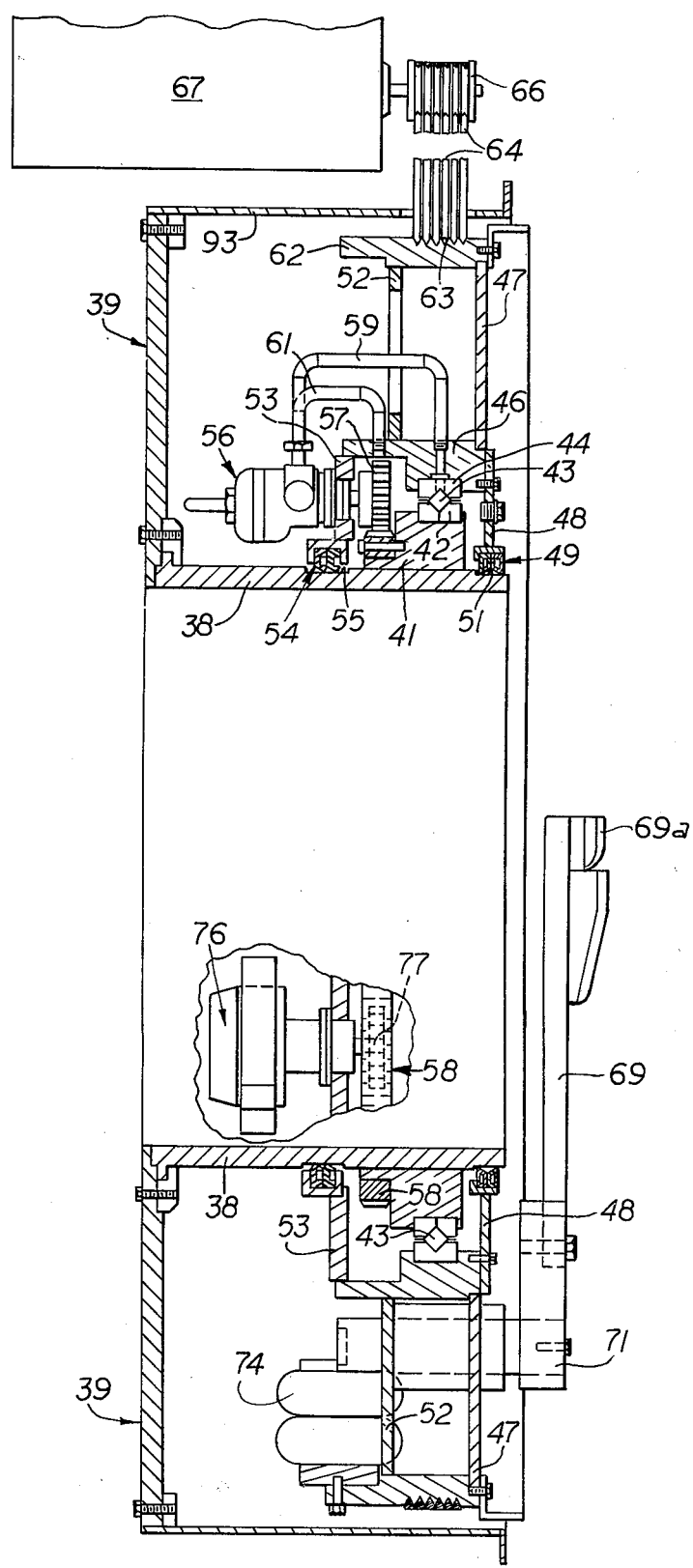
FIG. 5 is a still further enlarged detail sectional view taken generally along line 5—5 of FIG. 4; and, FIG. 6 is a view generally to the scale of FIG. 4 looking at the infeed end of the ring, removed from the remaining portions of the apparatus.

Also projecting radially outwardly from the member 46 in another plate 52. Likewise, another radial plate 53 is carried by the member 46 adjacent its inner end as illustrated particularly in FIG. 5. The plate 53 carries another oil seal 54 which is in rotary contact with a machined, annular seat 55 on the member 38.

As will presently appear as the description proceeds, member 38 remains stationary while all of the parts so far described which are located outwardly of member 41 and the inner race 42 of the bearing rotate about the member 38. Furthermore, there is provided between the plates 48 and 53 an annular, relatively large volume compartment for the reception of lubricant which is employed to bathe and always lubricate the bearing.

Mounted on the plate 53 is an oil circulating pump 56. The pump 56 is made fluid-tight to the side of the plate 53 and has its shaft projecting into the oil compartment. The shaft of the pump carries a pinion 57.

Mounted on the member 41 to remain stationary with that member and the inner member 38 is an anular ring gear 58. The teeth of the ring gear 58 are in mesh with the pinion 57 and consequently when the outer portion or ring of the debarker rotates the pinion rotates, driving the pump. The pump is connected to the oil compartment by an inlet line 59 and an outlet line 61, whereby the supply of oil in the compartment between the plates 48 and 53 is circulated. That is to say, oil is supplied through the line 59 directly to the bearing through suitable portings in the member 46 and in the outer race 44 whereby it flows through the bearing, into the compartment, where it is returned to the pump through line 61.

Carried by the peripheries of the plates 52 and 47 is a member 62 which is grooved as at 63 to provide a multiple V-belt sheave or pulley. It will be noted that the sheave 63 is directly radially outwardly of the main support bearing. The importance of this will be later explained.

Passing around the sheave 63 is a multiple V-belt drive 64 which in turn passes over a sheave 66 carried by a motor 67. The motor 67 is carried on a suitable motor mount 68 which in turn is carried by certain supporting framework as presently will appear.

Figure 4:
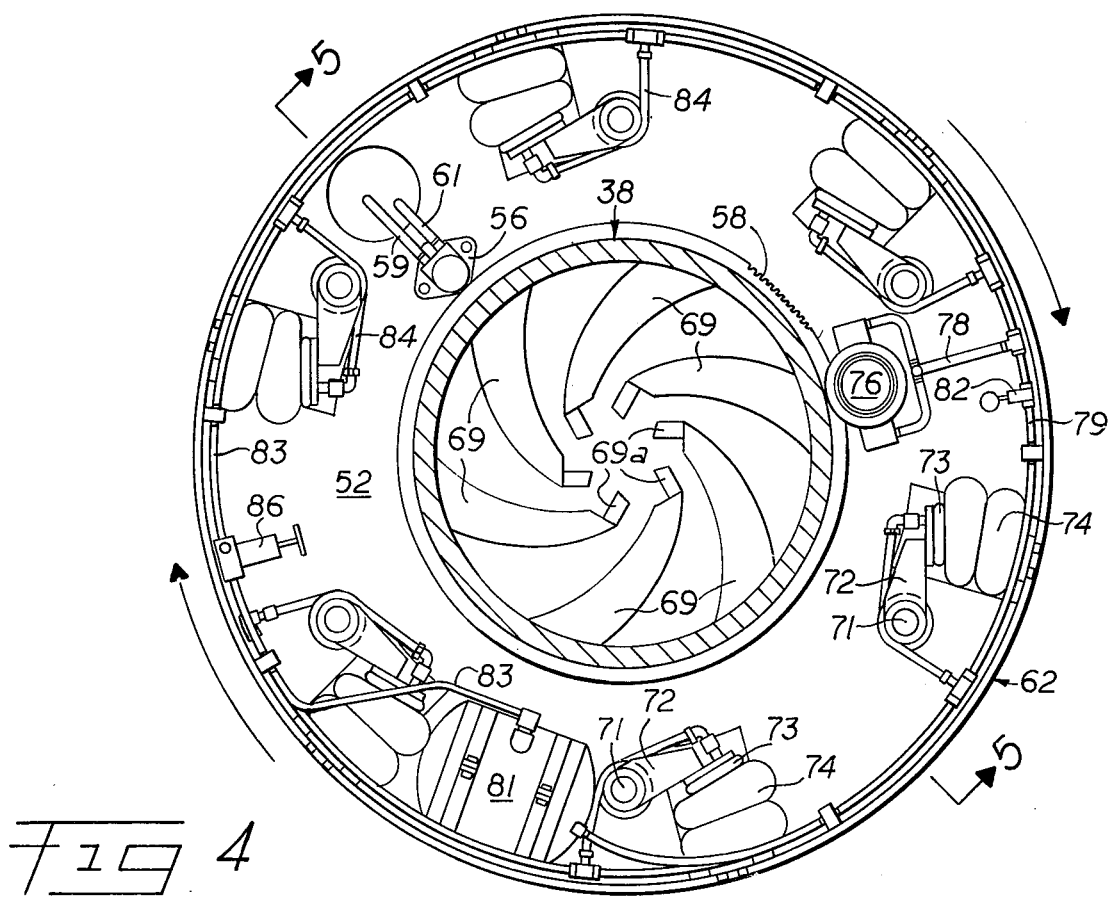
FIG. 4 is an enlarged detail sectional view taken generally along line 4—4 of FIG. 1.
Figure 6:
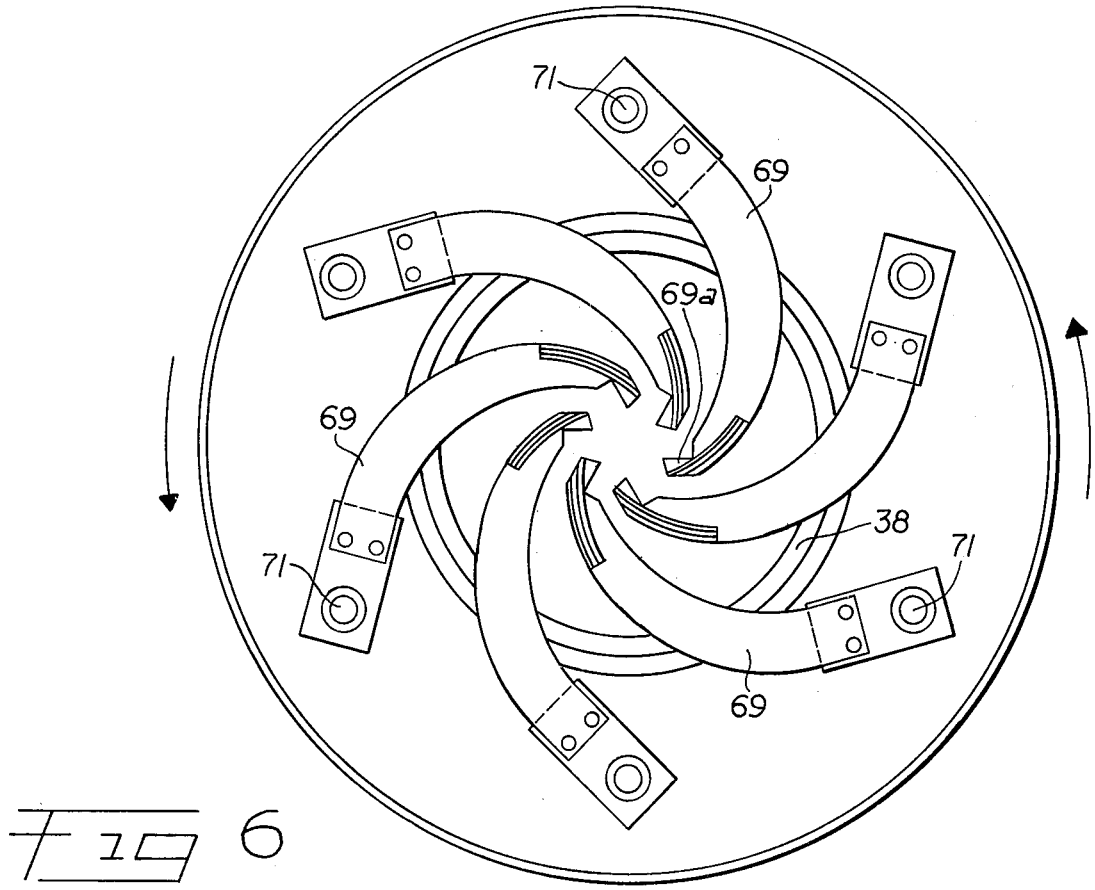

Referring now particularly, again, to FIGS. 4 and 5, it will be seen that the outer rotary portion of the apparatus carries a plurality of debarker arms 69 having inner, working ends 69a. The arms are displaced outwardly of the infeed end of the ring support member so that the working ends 69a are free to contact a log passing through the machine. The outer ends of the arms 69 are non-rotatably secured to shafts 71 journaled in suitable bearings in the plates 47 and 52. Each shaft 71 has non-rotatably secured thereto an arm 72. The arms 72 rest on the metal plates 73 of fluid pressure means, preferably in the form of air bags indicated at 74 in turn mounted to the plate 62. While there may be many suitable forms of fluid pressure means for operating the arms, nevertheless we prefer to use devices which are called "AIR MOUNTS". When fluid under pressure is supplied to the inside of the flexible air bags 74 the working ends 69a of the tool arms are biased into debarking relation to a log passing through the member 38.

Mounted on a side of the plate 53 is an air compressor indicated generally by the numeral 76. The air compressor is provided with a pinion 77 in turn meshing with the ring gear 58. Air under pressure from the compressor 76 is supplied through a pressure relief valve 82. Air in turn is supplied to each of the units 74 from the tank or receiver 81 through a line 83 and suitable branch conduits 84, all through a pressure regulator 86. See FIG. 4.

It will be noted that the oil pump 56, the air compressor 76 and the air receiver or tank 81 are located generally 120° apart. The purpose of this is to provide dynamic balance for the rotating part of the apparatus inasmuch as these units weigh, within practical limits, substantially the same.

In order to accommodate the debarking of logs of varying diameters within the range for which the unit is designed, we make provision for moving the entire debarker vertically to align the same horizontally with the lower infeed rolls 19 and outfeed rolls 33. To this end we provide vertical frame members 87 which are secured at the bottom and top to the members 10 and 13, and thus form a part of the framework. Carried by the end plate 39 are members 88 which slide on the vertical support members 87. A fluid pressure cylinder 89 is connected as at 90 to the plate 39. Fluid under pressure from a source not shown may be admitted to the connection 91, whereby the entire debarker may be raised and lowered at will to align the opening of the member 38 with an oncoming log to be debarked.

As before stated, the motor 67 is carried on its motor mount 68 and the motor mount 68 in turn is supported from members 92 carried by the sliding members 88.

From the foregoing the method of constructing and using our improved debarker and the various advantages thereof may now be more fully explained and understood. First, it is to be noted particularly that the central member 38 through which the logs pass while being debarked is supported in cantilever fashion by the plate 39 which in turn is supported from the framework by the members 88, whereby the entire apparatus may be moved up and down by the fluid pressure cylinder 89. The entire rotary portion or ring of our improved debarker which carries the debarking arms themselves is supported for rotation on the main bearing, the inner race of which is in effect carried by the central member 38. Furthermore, the motor is so located that the belts 64 are in radial alignment with the bearing whereby when properly tensioned for driving the apparatus a portion of the weight of the rotating part of our improved debarker is in fact supported by the belts. That is to say, since the motor itself is in effect supported from the frame through members 88 and the cylinder 89, the required drive tension of the belts between the motor sheaves 66 and 63 provides additional support which relieves some of the weight from the bearing. Furthermore, the concept of cantilever support of the member 38, from the discharge end of the debarker, permits the use of the ring gear 58 and consequently the use of the same for driving the oil pump and air compressor.

The lubrication for the bearing is provided by substantially filling the compartment between the plates 48 and 53 with a suitable lubricant. As the ring rotates the pump of course is driven and this causes a continuous circulation of oil through the bearing and axially outwardly from both ends thereof, thus at all times assuring proper and adequate lubrication of the bearing.

In operation through various controls not shown the logs to be debarked are fed from right to left as viewed in FIG. 1, namely, with the rolls 19 powered from their motor 28 and with the roll 18 acting as a hold-down roll. The vertical height of the entire debarker is adjusted through the cylinder 89 so that the log passes substantially through the center of the opening in the member 38. On the outfeed side the log is supported on the driven rolls 33 while being held down by roll 29.

From the foregoing it will be apparent that we have devised an improved, simple and trouble-free ring type debarker. As of the date of the filing of this application the assignee hereof has built one of these units and tests so far indicate that the apparatus is entirely satisfactory in every respect. Furthermore, while the particular debarker which has been built was designed to take logs of from 5 inches to 30 inches in diameter, the principles of our design are readily applicable to the construction of debarkers to take logs of almost any size. Our invention further is characterized by the fact that all of the parts may be completely enclosed by suitable cover plates such, for instance, as an annular plate indicated by the numeral 93 which is carried by the plate 39 and which extends forwardly to substantially cover the entire mechanism. The use of the self-contained oil pump and air compressor eliminates many difficulties with respect to the functions of these devices such for instance as rotary valves, flexible connections, etc. Our invention is particularly characterized by the fact that there are no separate drives required either for the air compressor or for the oil circulating pump.

While we have shown our invention in but one form, it will be obvious to those skilled in the art that it is not so limited, but is susceptible of various changes and modifications without departing from the spirit thereof.

What we claim is:

1. In a ring type debarker,
   (a) a centrally disposed tube-like support member with its longitudinal axis lying substantially horizontally and having an internal diameter sufficient to permit logs to be fed into an infeed end thereof and discharged from an outfeed end thereof,
   (b) means connected to the support member adjacent the outfeed end thereof for supporting the same,
   (c) a debarker arm carrying member mounted for rotation relative to the support member,
   (d) a plurality of debarker arms pivotally mounted on the arm carrying member adapted to engage and debark a log while passing through the support member,
   (e) fluid pressure responsive operators associated with each of said arms effective when pressurized to bias the arms into debarking contact with a log passing through the apparatus,
   (f) a pump for supplying fluid under pressure to said fluid pressure responsive means, said pump being mounted on and rotatable with the arm carrying member,
   (g) an annular gear associated with the support member and having its teeth on the outer circumference thereof,
   (h) a pinion carried by the pump and meshing with said gear, whereby rotation of the pump with the arm carrying member drives the pump,
   (i) a belt sheave on the outer surface of the arm carrying member, and
   (j) a motor and belt operative through said sheave to rotate the arm carrying member.

2. Apparatus as defined in claim 1 in which the debarking arms carried by the arm carrying members are displaced outwardly from the infeed end of the ring support member.

3. Apparatus as defined in claim 1 in which the fluid pressure responsive operators are flexible air bags.

4. Apparatus as defined in claim 1 in which the drive belt for said arm carrying member is under tension between said member and said motor, and means supporting the motor independently of said member, whereby a part of the load of the arm carrying member is carried by the motor through said belt.

5. Apparatus as defined in claim 1 in which the support member and hence the arm carrying member carried thereby is mounted for vertical movement thereby to center the debarker relative to oncoming logs of different diameters.

* * * * *